US007424230B2

(12) United States Patent
Tomizawa et al.

(10) Patent No.: US 7,424,230 B2
(45) Date of Patent: Sep. 9, 2008

(54) DIGITAL TRANSMISSION SYSTEM

(75) Inventors: Masahito Tomizawa, Yokosuka (JP); Akira Hirano, Yokohama (JP); Yoshiaki Kisaka, Yokosuka (JP); Yutaka Miyamoto, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 608 days.

(21) Appl. No.: 10/308,588

(22) Filed: Dec. 3, 2002

(65) Prior Publication Data

US 2003/0118345 A1 Jun. 26, 2003

(30) Foreign Application Priority Data

Dec. 5, 2001 (JP) ............................. 2001-371150
Jun. 26, 2002 (JP) ............................. 2002-186634

(51) Int. Cl.
*H04B 10/06* (2006.01)
*H04L 25/03* (2006.01)
*H03M 13/00* (2006.01)

(52) U.S. Cl. .................. 398/202; 375/317; 714/709
(58) Field of Classification Search ................ 398/202; 375/316, 317, 287, 340; 714/709; 382/240; 455/226.1–226.3

See application file for complete search history.

(56) References Cited

U.S. PATENT DOCUMENTS

| 5,652,767 | A | 7/1997 | Kiyonaga et al. | |
|---|---|---|---|---|
| 6,477,279 | B2 * | 11/2002 | Go | 382/240 |
| 6,546,057 | B1 * | 4/2003 | Yeap | 375/285 |
| 6,760,552 | B1 * | 7/2004 | Tajima et al. | 398/210 |
| 6,847,789 | B2 * | 1/2005 | Savoj | 398/155 |
| 2001/0015845 | A1 * | 8/2001 | Ito et al. | 359/189 |
| 2004/0165895 | A1 * | 8/2004 | Taga et al. | 398/202 |

FOREIGN PATENT DOCUMENTS

EP 0455910 A2 11/1991

(Continued)

OTHER PUBLICATIONS

"Adaptive Decision Feedback Equalizer For 10 GBIT/S Dispersion Mitigation", F. Buchali, H. Buelow, W. Kuebart, ECOC 2000, Sep. 3-7, 2000, Munich, Germany, pp. 101-102.

(Continued)

*Primary Examiner*—Jason Chan
*Assistant Examiner*—Nathan M Curs
(74) *Attorney, Agent, or Firm*—Harness, Dickey & Pierce, P.L.C.

(57) ABSTRACT

This digital transmission system is provided with a transmitting apparatus that transmits digital data signals and a receiving apparatus that receives the digital data signals transmitted over a transmission path, compares the signals with a predetermined threshold value, and performs decision reproduction. The receiving apparatus is formed by: decision circuits that receive the input of reception signals, discriminate between the respective reception signals using a plurality of threshold values, and output decision results; and a selection circuit that, based on the decision results output from the decision circuit, selects one decision result from one threshold value from among the decision results from each of the plurality of threshold values, and outputs the selected decision result. As a result, the receiving apparatus is able to individually select which decision result to use from which threshold value.

31 Claims, 10 Drawing Sheets

FOREIGN PATENT DOCUMENTS

| | | |
|---|---|---|
| EP | 0912020 A2 | 4/1999 |
| WO | WO 00/51271 | 8/2000 |

OTHER PUBLICATIONS

"FEC Techniques in Submarine Transmission Systems", Omar AIT SAB, OFC 2001, TuF1, Mar. 2001.

"Error Correction Without Additional Redundancy By Novel Optical Receiver With Diverse Detection", Masahito Tomizawa, Yoshiaki Kisaka, Akira Hirano, and Yutaka Miyamoto, OFC 2002, WX7, pp. 368-370, Mar. 17-22, 2002.

"PMD Mitigation by Frequency Diverse Detection Receiver Employing Error-Correction Function", Masahito Tomizawa, Yoshiaka Kisaka, Akira Hirano, and Yutaka Miyamoto, ECOC 2002, 7.1.4, Sep. 8-12, 2002.

European Search Report EP 02 29 2977 dated Feb. 6, 2003, along with date-stamped cover letter from Shiga Patent Office dated Mar. 3, 2003.

* cited by examiner

FIG. 3 SECOND EMBODIMENT OF THE PRESENT INVENTION

FIG. 4 THIRD EMBODIMENT OF THE PRESENT INVENTION

FOURTH EMBODIMENT OF THE PRESENT INVENTION

SIXTH EMBODIMENT OF THE PRESENT INVENTION

SEVENTH EMBODIMENT OF THE PRESENT INVENTION

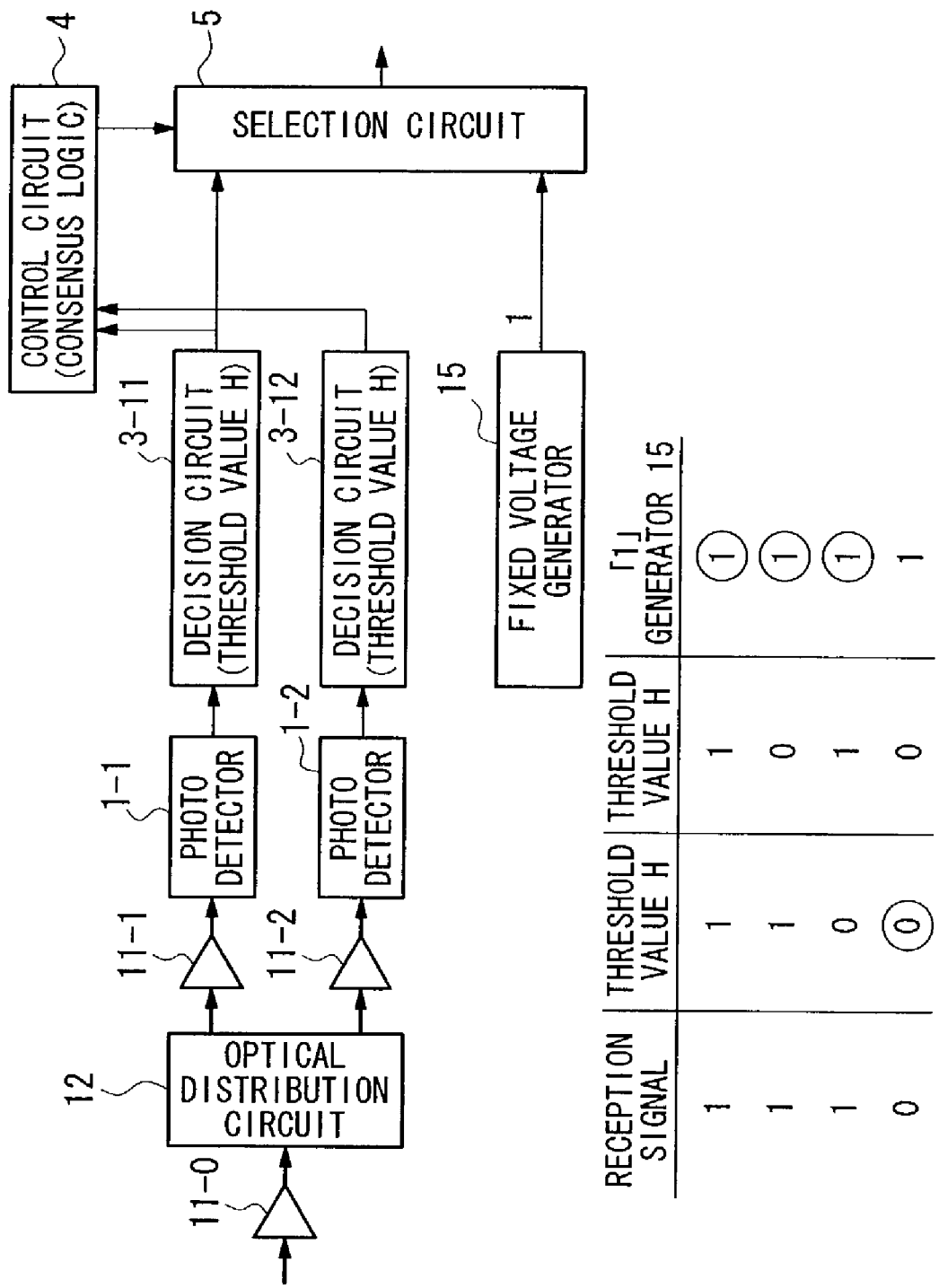
FIG. 8 EIGHTH EMBODIMENT OF THE PRESENT INVENTION

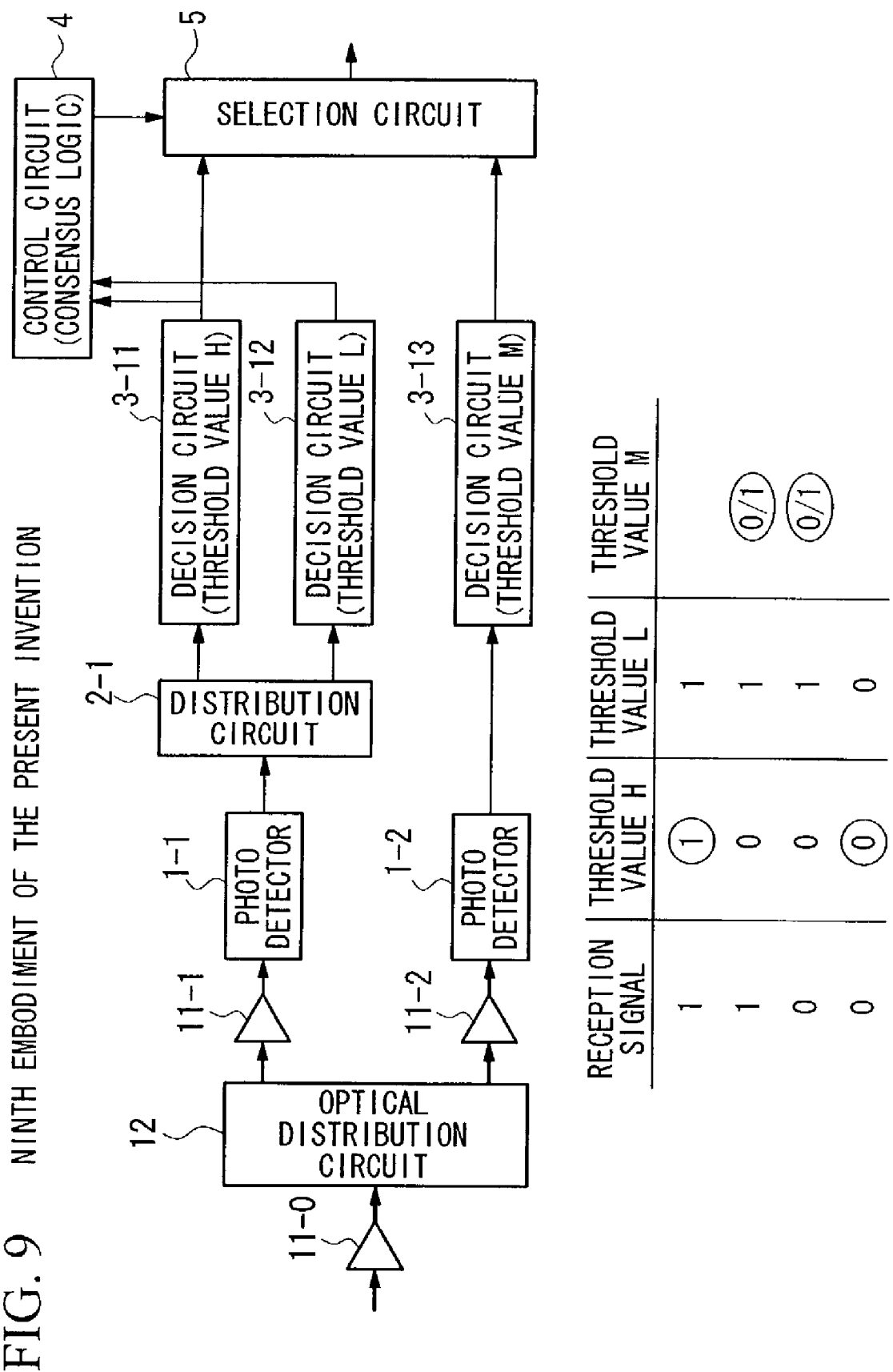
FIG. 9 NINTH EMBODIMENT OF THE PRESENT INVENTION

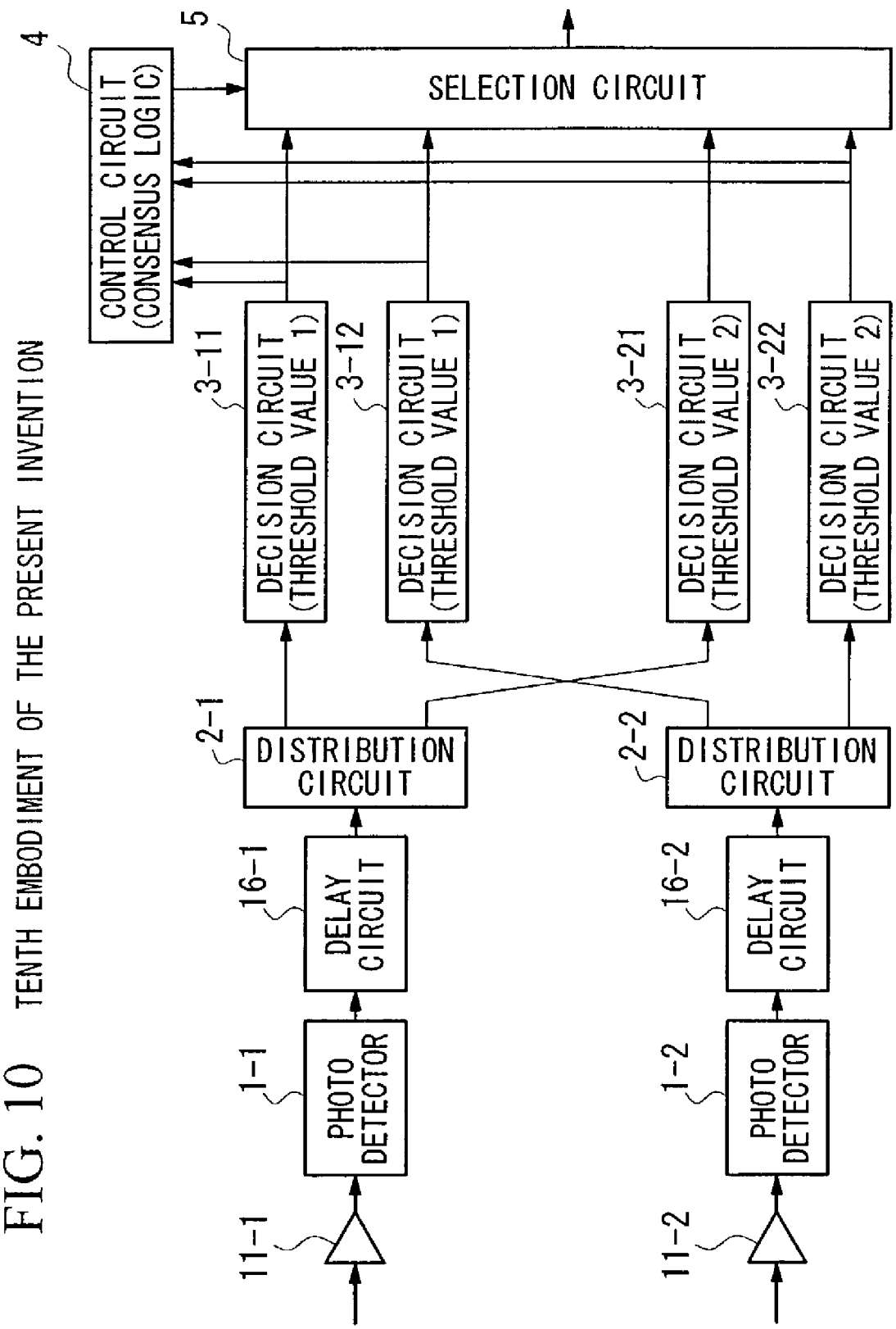
FIG. 10 TENTH EMBODIMENT OF THE PRESENT INVENTION

DIGITAL TRANSMISSION SYSTEM

CROSS-REFERENCE TO RELATED APPLICATIONS

This application is based on patent application Nos. 2001-371150 and 2002-186634 filed in Japan, the contents of which are incorporated herein by reference.

FIELD OF THE INVENTION

The present invention relates to a digital transmission system that performs the transmission of digital signals (electrical signals, optical signals, and the like). In particular, the present invention relates to a digital transmission system that makes high quality transmissions possible without raising the transmission bit rate.

BACKGROUND OF THE INVENTION

In a transmission system that uses optical fibers it is possible to achieve a transmission capacity of 40 Gbit/s (gigabits per second) using a single wavelength. The transmission scheme (especially for modulation and demodulation) commonly used in this type of transmission system is the simplest scheme and is known as IM-DD (Intensity Modulation-Direct Detection). In this scheme, a transmitter performs on/off modulation of the optical intensity in accordance with digital 0 and 1 signals. A receiver converts the optical intensity into electrical amplitude signals by direct photoelectric conversion, and reproduces the signals by determining using a decision circuit whether a signal is 0 or 1 based on a predetermined threshold value. Here, the threshold value set in the decision circuit is normally fixed when the decision circuit is operating, and there are two methods for deciding this threshold value. One method involves optimization while the decision circuit is not connected to the optical fiber transmission path (so called back-to-back configuration), while the other method involves optimization while the decision circuit is connected to the optical fiber transmission path. In commercial systems and the like, the former method is employed because of its wide application range.

In the decision circuit of the receiver in an optical transmission system, wrong identifications of 0 and 1, namely, bit errors occur due to chromatic dispersion in the optical fiber and Amplified Spontaneous Emission (ASE) optical noise in an optical amplifier located not only on the transmission path, but also in transmitter or receiver. In high speed transmissions of 40 Gbit/s, these bit errors are a factor in limiting the transmission distance and, therefore, measures to counter them are necessary. These countermeasures can be roughly categorized into two types. The first type is forward error correction (FEC), and the second type is decision feedback equalization (DFE). Note that, in the most widely used error correction technology (ITU-T recommendation G.975), the threshold value of the decision circuit is fixed.

When performing error correction on the receiving side, firstly, predetermined calculation processing is performed on the transmission information on the transmitting side, and redundant bits obtained as a result thereof are attached and transmitted. Accordingly, there is normally an increase in the bit rate. On the receiving side, the predetermined calculation processing is performed on the received signals again, the result of this calculation processing is compared with the received redundant bits, and an error position is detected and a correction made by exclusive OR.

In contrast, the decision feedback equalizer method is proposed as a method for dealing with burst errors (F. Buchali et al., "Adaptive Decision Feedback Equalizer for 10 Gbit/s Dispersion Mitigation", ECOC' 00, 5.2.5). In this method, there is one structure in which the bit error rate (BER) of decision reproduced signals or the like is measured, and the threshold value of the decision circuit is variably controlled such that this output bit error rate is at the minimum. There is also another structure in which the optimum decision circuit is selected from among a plurality of decision circuits in each of which a different threshold value is set.

However, the above described technologies have the following drawbacks.

FEC has the problem that the bit rate of the transmission signals is raised. For example, in super FEC, which is currently being examined in submarine transmission systems, 7% redundant bits and 12% redundant bits are connected in serial, so as to create a total of 22% redundant bits (O. A. Sab, "FEC Techniques in Submarine Transmission Systems", OFC '01, TuF-1). However, in a high speed transmission such as 40 Gbit/s, the bit rate is approximately 49 Gbit/s, and the possibility arises that the speed margin of the electronic circuit will not be sufficient. Moreover, an interleaving circuit that mixes up the bit transmission sequence is used between the two encoding circuits, so that the circuitry size is increased. Furthermore, because some iteration decoding technology is used, the decoding delay cannot be ignored.

In this way, in FEC, there is a trade off relationship between the transmission signal bit rate and the coding gain (the forward error correction performance), and a way to obtain the maximum coding gain with the minimum rise in the bit rate is being investigated. In addition, FEC is effective against random errors, but is not particularly effective against burst errors. For example, in the gradual changes that occur in phasing phenomena such as polarization mode dispersion, it is supposed that the bits of the majority of the code words are erroneous, however, in this case, error correction performance is limited (M. Tomizawa et al., "FEC Performance in PMD-Limited High-Speed Optical Transmission Systems", ECOC '00, 5.2.4).

In contrast, the drawback with decision feedback equalization (DFE) is that because the structure uses a feedback control circuit, there is a lengthy processing time and it is not possible to track rapid changes, e.g., within a bit-period. For example, in order to measure the bit error rate of a result output from a variable decision circuit (or selected output results from a plurality of decision circuits), and set (or select) a suitable threshold value, a control time corresponding to between several bits and several hundred bits is needed. Accordingly, DFE is effective against phasing, but is not effective against random errors, caused by noise or the like, in which there is no correlation between bit-errors.

Note that the above description is for an optical transmission system, however, the description also applies in the case of general wired or wireless electrical digital signal transmissions.

SUMMARY OF THE INVENTION

Accordingly, it is an object of the present invention to provide a digital transmission system that compensates for the respective drawbacks in FEC and DFE and can be applied both to systems limited by noise and systems limited by phasing, and that makes possible high quality transmissions without raising the transmission bit rate.

According to the present invention, the above object can be achieved by a digital data signal receiving apparatus comprising: decision circuits that receive an input of reception signals, make a decision about the reception signals using a plurality of threshold values, and output the decision results; and a selection circuit that, based on the decision results output from the decision circuits, selects a decision result from one threshold value from among the decision results from the plurality of threshold values, and outputs the selected decision result.

In addition, the above object can be achieved by a digital transmission system having a transmitting apparatus that transmits digital data signals and a receiving apparatus that receives the digital data signals transmitted over a transmission path, compares them with a predetermined threshold value, and performs decision reproduction, wherein the receiving apparatus comprises: k number (i.e., k×n) of decision circuit sets each having different threshold values, with one set formed by a plurality (n number) of decision circuits having the same threshold value; distribution circuits that distribute reception signals to the decision circuits; a selection circuit that selects and outputs one decision result from the decision circuits; and a control circuit that controls the selection circuit such that the input of the decision results is received from each decision circuit, a set in which the decision results of n number of decision circuits are the same is selected from all sets, and the decision result of one decision circuit from that one set is selected.

In addition, the above object can be achieved by a digital transmission system having a transmitting apparatus that transmits digital data optical signals and a receiving apparatus that receives the digital data optical signals transmitted over an optical transmission path, converts the digital data optical signals into electrical signals, compares the electrical signals with a predetermined threshold value, and performs decision reproduction, wherein the receiving apparatus comprises: k number (i.e., k×n) of decision circuit) sets each having different threshold values, with one set formed by a plurality (n number) of decision circuits having the same threshold value; distribution circuits that distribute the electrical signals to the decision circuits; a selection circuit that selects and outputs one decision result from the decision circuits; and a control circuit that controls the selection circuit such that the input of the decision results is received from each decision circuit, a set in which the decision results of n number of decision circuits are the same is selected from all sets, and the decision result of one decision circuit from that one set is selected.

In addition, the above object can be achieved by a digital transmission system having a transmitting apparatus that transmits digital data optical signals and a receiving apparatus that receives the digital data optical signals transmitted over an optical transmission path, converts the digital data optical signals into electrical signals, compares the electrical signals with a predetermined threshold value, and performs decision reproduction, wherein the receiving apparatus comprises: k number (i.e., k×n) of decision circuit sets each having different threshold values, with one set formed by a plurality (n number) of decision circuits having the same threshold value; an optical distribution circuit that distributes the digital data optical signals to n series; n series of photo detectors that receive the optical signals distributed to the n series; optical amplifiers that amplify optical signals at at least one of the optical distribution circuits and the photo detectors that are upstream of the optical amplifiers; n series of distribution circuits that distribute the electrical signals output from the n series of photo detectors to the k sets of decision circuits that each have a different threshold value; a selection circuit that selects and outputs one decision result from the decision circuits; and a control circuit that controls the selection circuit such that the input of the decision results is received from each decision circuit, a set in which the decision results of n number of decision circuits are the same is selected from all sets, and the decision result of one decision circuit from that one set is selected.

By employing a system such as this, it is possible to perform effective error control without raising the transmission signal bit rate. Moreover, because a structure is employed in which a threshold value is selected that gives a low error rate, it is possible to perform effective error control by continuously selecting an optimum threshold value even for degradation of phasing and the like. Furthermore, because it is possible to select a threshold value instantaneously for each bit using a feed forward structure, it is possible to perform error control from moment to moment a signal is received, and it is also possible to respond effectively to random errors in which there is no correlation between bits. In addition, it is also possible to perform effective error control for signal errors caused by noise of the transmission path or repeater.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 shows the structure of a receiver according to the eighth embodiment of the present invention.

FIG. 9 shows the structure of a receiver according to the ninth embodiment of the present invention.

FIG. 10 shows the structure of a receiver according to the tenth embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

The following embodiments do not restrict the interpretation of the claims relating to the present invention, and the combination of all the features explained in the embodiments is not always an indispensable means of solving the problem.

A detailed description will now be given of the embodiments of the present invention using the diagrams.

First Embodiment

Figure 1:
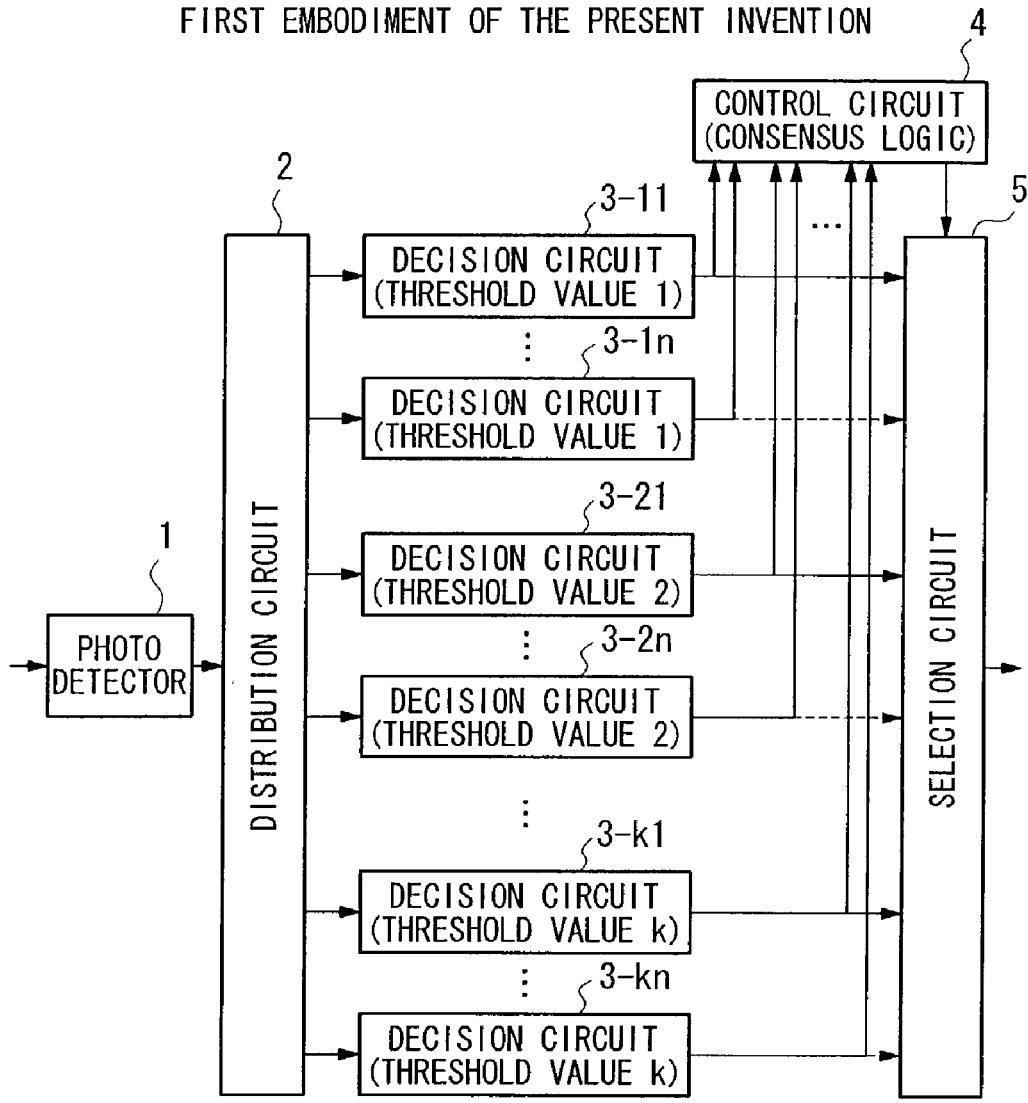
FIG. 1 shows the structure of a receiver according to the first embodiment of the present invention.

FIG. 1 shows the first embodiment of the present invention. Note that the structure of the transmitting apparatus side is the same as a conventional structure, and here an example of the structure of the receiving apparatus side is shown. Furthermore, a description is given of an example of a receiving apparatus in an optical transmission system; however, the present embodiment is not limited to this.

In FIG. 1, optical signals are converted into electrical signals by a photo detector 1. These electrical signals are then distributed to a plurality of series by a distribution circuit 2, and are input respectively into decision circuits 3-11 to 3-1n for a threshold value 1, decision circuits 3-21 to 3-2n for a threshold value 2, and decision circuits 3-k1 to 3-kn for a threshold value k. Namely, if n number of decision circuits for the same threshold value are taken as 1 set, the electrical signals can be distributed to the decision circuits of k sets. The number of distributions is the product (i.e., n×k) of the number n of decision circuits having the same threshold value with the types k of threshold values. The decision result of each decision circuit is input into a control circuit 4, and the decision result of at least one decision circuit from each set is input into a selection circuit 5. The control circuit 4 controls the selection circuit 5 based on the decision result of each decision circuit, and selects and outputs the decision result of one decision circuit.

In the present embodiment, signals in which Signal-to-Noise (S/N) ratio degradation on the optical transmission path and waveform degradation such as phasing have occurred are input into the respective decision circuit, and the noise in each decision circuit is further added independently of each other. Accordingly, in each decision circuit, as a result of this noise addition, sets in which the n number of decision results for the same threshold value all show the same value (1 or 0), and sets in which some of the n number of decision results show different values are generated. The control circuit 4 receives the input of the decision result of each decision circuit, and selects those sets in which the n number of decision results for the same threshold value all show the same value (logic 1 or 0), and whichever one is the majority out of the sets showing the logic 1 and the sets showing the logic 0. For example, if, out of k sets, there are more sets showing logic 1 than logic 0, then one of the sets showing logic 1 is selected, and one decision result is then selected from the n number of decision circuits of that set. The logic of this control circuit 4 can be called "consensus logic", which is intended to obtain the decision result having the highest degree of precision. Note that when the determinations are divided exactly equally, then it is possible for the selection circuit to maintain the existing state, or for the selection circuit to be pre-set in advance so as to select one or the other.

An example of the consensus logic of the control circuit 4 is shown in FIG. 1. Here, it is assumed that there are three decision circuits for five different threshold values. In the threshold values 1, 2, and 3 the three decision results are taken as logic 1; in the threshold value 4 two decision results are taken as logic 1 and one decision result is taken as logic 0; and in the threshold value 5 three decision results are taken as logic 0. In this example, the output of one of the decision circuits of the threshold values 1, 2, and 3 that output logic 1 is selected as the decision result. For example, if the threshold value 2 is selected, then the output of one decision circuit is output from the selection circuit 5 as the representative from the n number of decision circuits (3-21 to 3-2n) of the threshold value 2. As a result, the bit error characteristics are improved.

Bit errors may occur even in the above described consensus logic in cases such as: (1) an output is made even when there is no set in which the n number of decision results all show the same value for k sets of decision circuits; and (2) each decision circuit is in error in exactly the same way. Here, if the bit rate error in the optimum fixed threshold value is taken as p, and the bit rate errors for k types of different threshold value are taken as $p_1, p_2, \ldots,$ and $P_k$, then the number for (1) above is equal to $n^k$, and the probabilities of each are $p_1 \dot{} p_2 \dot{} \ldots \dot{} p_k$. The probabilities for (2) are expressed as $(p_j)$ for each threshold value using the bit rate error $p_j$ of that threshold value. Accordingly, the probability Pe that an error will be transmitted downstream can be shown by:

$$Pe = \sum_{j=1}^{n} P_j^n + n^k \prod_{i=1}^{k} p_i$$

Figure 2:
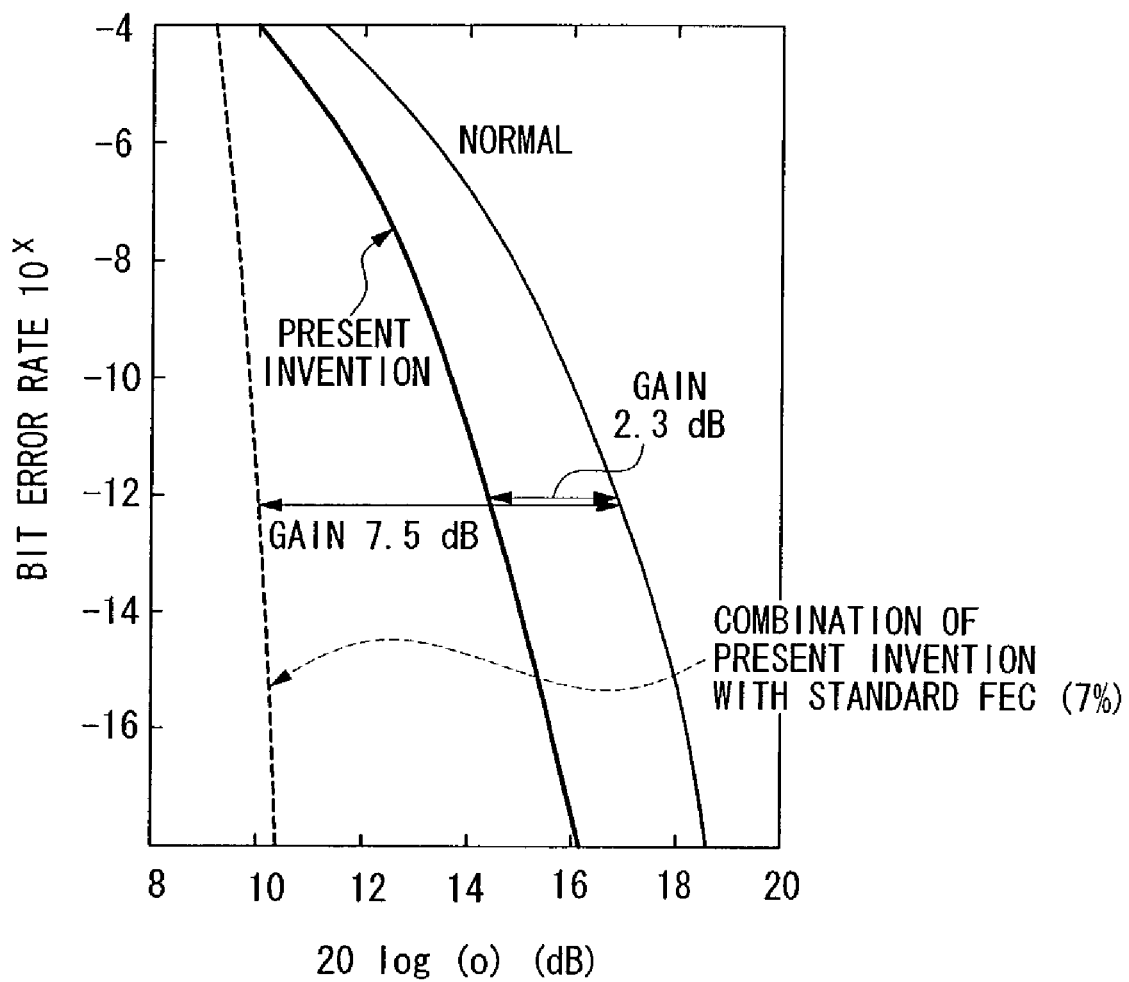
FIG. 2 is a view showing error rate characteristics according to the first embodiment.

For example, when n=k=2, and if it is assumed that $p_1 = p_2 = 5p$, then: $Pe = 150\,p^2$. Accordingly, when $p = 10^{-6}$, then $Pe = 1.5 \times 10^{-10}$, and it can be seen that there is a satisfactory error-rate improving effect. The result when this error-rate improving effect is estimated is shown in FIG. 2. Here, if the decibel (dB) difference between the Q-value at an error rate of $10^{-12}$ in a receiving apparatus in which there is no selection operation fixed at the optimum decision point and in which there is no FEC, and the Q-value at an error rate of $10^{-12}$ when either the present invention or a combination of the present invention and FEC is used is defined as "gain", then in a receiving apparatus that uses the present invention the rise in the bit rate is 0 and the gain is 2.3 dB, while in a receiving apparatus that uses the present invention and FEC in combination, the rise in the bit rate is 7% and the gain is 7.5 dB.

Namely, the receiving apparatus of the present invention is provided with: decision circuits that receive an input of reception signals, make a decision about the respective reception signals using a plurality of threshold values, and output the decision results; and a selection circuit that, based on the decision results output from the decision circuit, selects a decision result from one threshold value from among the decision results from the plurality of threshold values, and outputs the selected decision result. By employing a structure such as this, it is possible to reduce the error rate without redundant code such as is used in FEC. In addition, by employing this type of structure, it is possible, based on signals received at a particular time, to appropriately control (select) threshold values in order to identify those bits themselves at that particular time (on bit-by-bit basis) without using feedback control such as DFE, which was described in the conventional technology.

Furthermore, in the receiving apparatus according to the present embodiment, for each bit or each code contained in the reception signals, the selection circuit makes a new selection each time as to which decision result to use from which threshold value. By employing a structure such as this, it is possible to respond immediately to changes in conditions due to signals transmitted from a transmission apparatus side or to factors on the transmission path.

Second Embodiment

Figure 3:
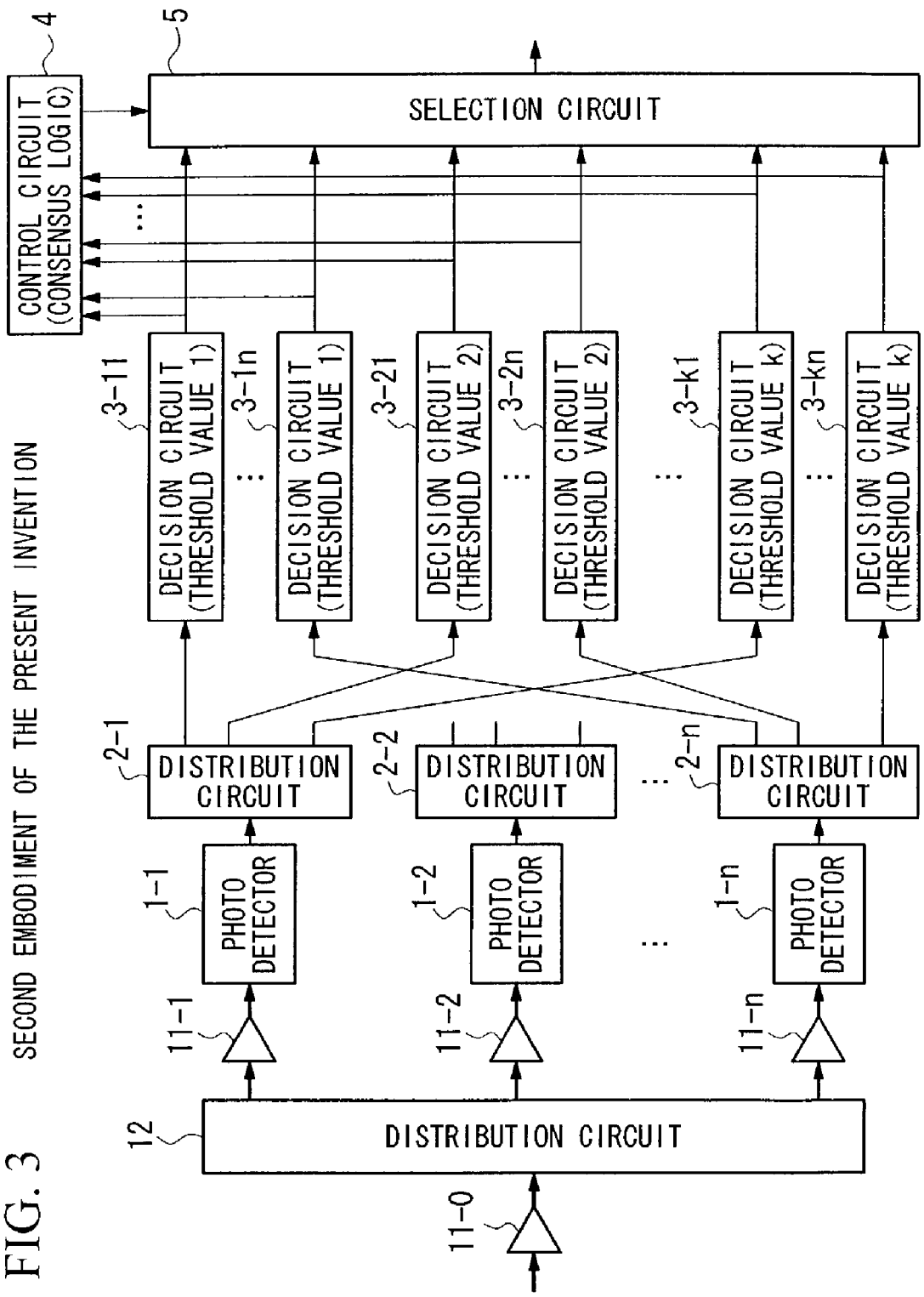
FIG. 3 shows the structure of a receiver according to the second embodiment of the present invention.

FIG. 3 shows the second embodiment of the present invention. Note that the structure of the transmitting apparatus side is the same as a conventional structure, and here an example of the structure of the receiving apparatus side is shown.

Furthermore, a description is given of an example of a receiving apparatus in an optical transmission system; however, the present embodiment is not limited to this.

In FIG. 3, the optical signals are amplified by an optical amplifier 11-0, and are distributed to a plurality (n number) of series by an optical distribution circuit (optical coupler) 12. Each of the distributed optical signals is then amplified respectively by optical amplifiers 11-1 to 11-n, and is converted into an electrical signal by photo detectors 1-1 to 1-n. The respective electrical signals are then again distributed to a plurality (k number) of series by distribution circuits 2-1 to 2-n. Here, the distribution output of the distribution circuit 2-1 is input into a decision circuit 3-11 for the threshold value 1, a decision circuit 3-21 for the threshold value 2, and a decision circuit 3-k1 for the threshold value k. Thereafter, in the same way, the output from the distribution circuit 2-n is input into a decision circuit 3-1n for the threshold value 1, a decision circuit 3-2n for the threshold value 2, and a decision circuit 3-kn for the threshold value k.

The decision result of each decision circuit is then input into a control circuit 4 and a selection circuit 5. The control circuit 4 controls the selection circuit 5 based on the decision result of each decision circuit, and selects and outputs the decision result of one decision circuit.

In the present embodiment, signals that have passed through n series of optical amplifiers and photo detectors are input into n number of decision circuits of each set having the same threshold value, and including the independent noise of each and the noise of the decision circuits, it is possible to select a single decision result using the same "consensus logic" as in the first embodiment.

Note that the bit error rate characteristics of the optical signals are substantially decided by the SN ratio before the input into the receiving apparatus (optical amplifier), and it is known that there is almost no effect on the bit error rate characteristics even if there is loss from the number of splits once the signals have been amplified (Ishio et al., Optical Amplifiers and Their Applications (Ohmsha, Ltd.)). In contrast, in optical transmission systems it is known that noise of the optical amplifier and photo detector is predominant. Accordingly, the structure of the present embodiment, in which the noise of the optical amplifier and photo detector can be dealt with as independent phenomena, can also be applied to high quality transmissions in non-repeated long distance transmission systems.

Third Embodiment

Figure 4:
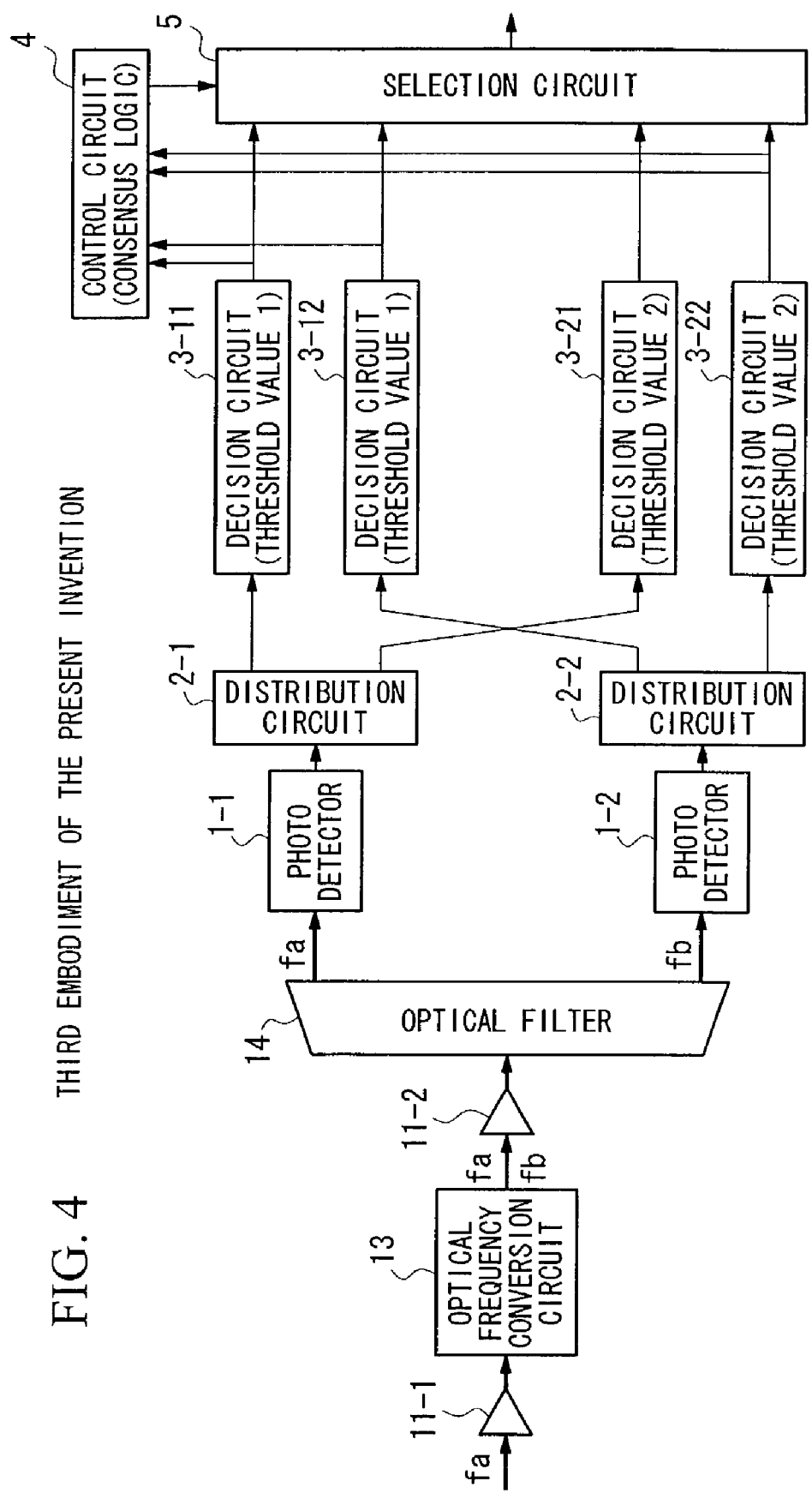
FIG. 4 shows the structure of a receiver according to the third embodiment of the present invention.

FIG. 4 shows the third embodiment of the present invention. Note that the structure of the transmitting apparatus side is the same as a conventional structure, and here an example of the structure of the receiving apparatus side is shown.

In FIG. 4, an optical signal is amplified by an optical amplifier 11-1, and undergoes optical frequency conversion by an optical frequency conversion circuit (for example, a wavelength converter element that uses non-linear effect) 13. Here, an optical signal having an optical frequency fa is converted into optical signals having optical frequencies of fa and fb. The optical signals of these two optical frequencies are amplified by an optical amplifier 11-2, and are then split into optical signals of the respective optical frequencies by an optical filter (an optical frequency separation filter) 14. Each of the split optical signals is then converted into an electrical signal by the respective photo detectors 1-1 and 1-2. These electrical signals are then further distributed to two series respectively by distribution circuits 2-1 and 2-2. Here, the distribution output of the distribution circuit 2-1 is input into a decision circuit 3-11 for the threshold value 1 and a decision circuit 3-21 for the threshold value 2; and the distribution output of the distribution circuit 2-2 is input into a decision circuit 3-12 for the threshold value 1 and a decision circuit 3-22 for the threshold value 2. The decision result of each decision circuit is then input into the control circuit 4 and the selection circuit 5. The control circuit 4 controls the selection circuit 5 based on the decision result of each decision circuit, and selects and outputs the decision result of one decision circuit.

In the present embodiment, electrical signals obtained by adding the noise of photo detectors to optical signals of different optical frequencies are input into two decision circuits having the same threshold value, and in the same way as in the second embodiment, including the independent noise of each and the noise of the decision circuits, it is possible to select a single decision result using the same "consensus logic" as in the first embodiment.

Fourth Embodiment

Figure 5:
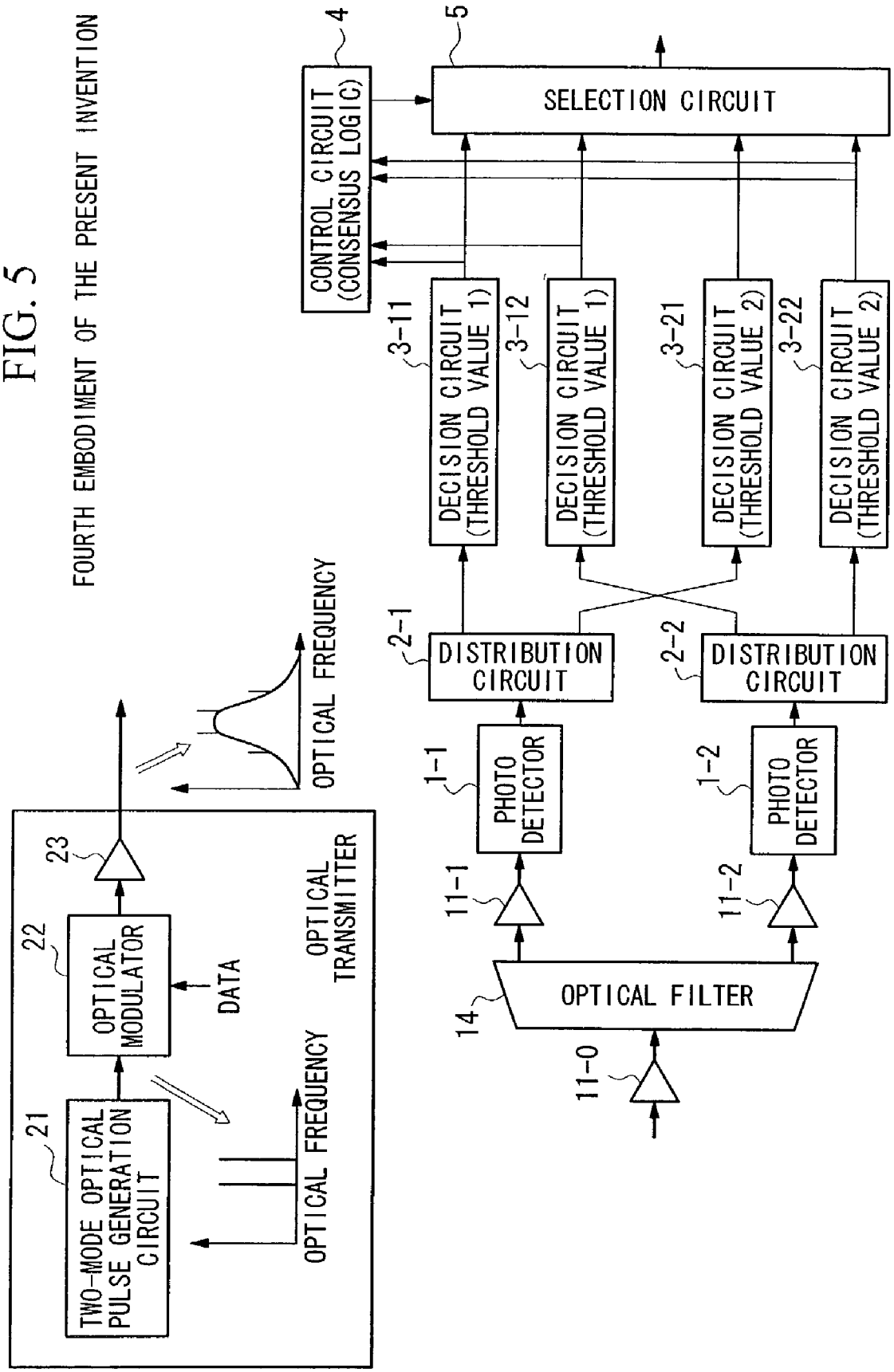
FIG. 5 shows the structure of a transmitter and receiver according to the fourth embodiment of the present invention.

FIG. 5 shows the fourth embodiment of the present invention. The features of the fourth embodiment lie in the transmitting apparatus side, while for the receiving apparatus the same structure can be used as that used in the third embodiment apart from the optical frequency conversion circuit.

In FIG. 5, an optical transmitter is formed by: a two-mode pulse generation circuit 21 that outputs optical pulses of a plurality of optical frequencies, for example, carrier suppressed return-to-zero pulses whose optical phases are mutually inverted; by an optical modulator 22, and by an optical amplifier 23. The optical modulator 22 modulates the two-mode pulses using NRZ data or duobinary data signals and then outputs optical signals of RZ pulses (CS-RZ (Carrier Suppressed Return-to-Zero) code or DCS-RZ (Duobinary Carrier Suppressed Return-to-Zero) code) formed by two frequency components of NRZ or duobinary.

An optical filter 14 of the receiving apparatus has a structure for performing SSB (Single Side Band) splitting, and splits the RZ pulses (CS-RZ code or DCS-RZ code) formed by two frequency components so as to form two separated NRZ signals or duobinary signals for CS-RZ and DCS-RZ respectively. Thereafter, in the same way as in the third embodiment, these signals are converted into electrical signals respectively by photo detectors 1-1 and 1-2, and these electrical signals are then input into the decision circuits 3-11 to 3-22 corresponding to each via distribution circuits 2-1 and 2-2. Then, a single decision result is selected using the same "consensus logic" as in the first embodiment.

In the present embodiment, the optical noise of each of the two frequency components is independent of each other, and the present embodiment makes use of the fact that noise received from all of the optical repeaters (amplifiers) on the optical transmission path becomes uncorrelated random noise between frequency components. As a result, by deciding optical signals corresponding to the two frequency components using decision circuits having different threshold values and selecting one using "consensus logic", it is even possible to improve bit errors caused by noise from optical repeaters.

Fifth Embodiment

In the transmitting apparatus of the fourth embodiment, a structure is employed in which optical pulses of two different optical frequencies output from the two-mode optical pulse generating circuit 21 are modulated using data signals by the optical modulator 22, however, it is also possible to employ a structure in which the optical modulation is achieved using data signals by continuous light of two different optical frequencies. As the continuous light generating circuit of this fifth embodiment, it is possible to use two laser sources having different emission wavelengths, or to use two side-mode generating circuits. For the receiving apparatus, the same structure can be used as that used in the fourth embodiment shown in FIG. 5. Note that, in the fourth embodiment it is necessary to control the modulation phase using data signals and phases of the optical pulses, however, phase control is not necessary in the structure of the present embodiment.

Sixth Embodiment

Figure 6:
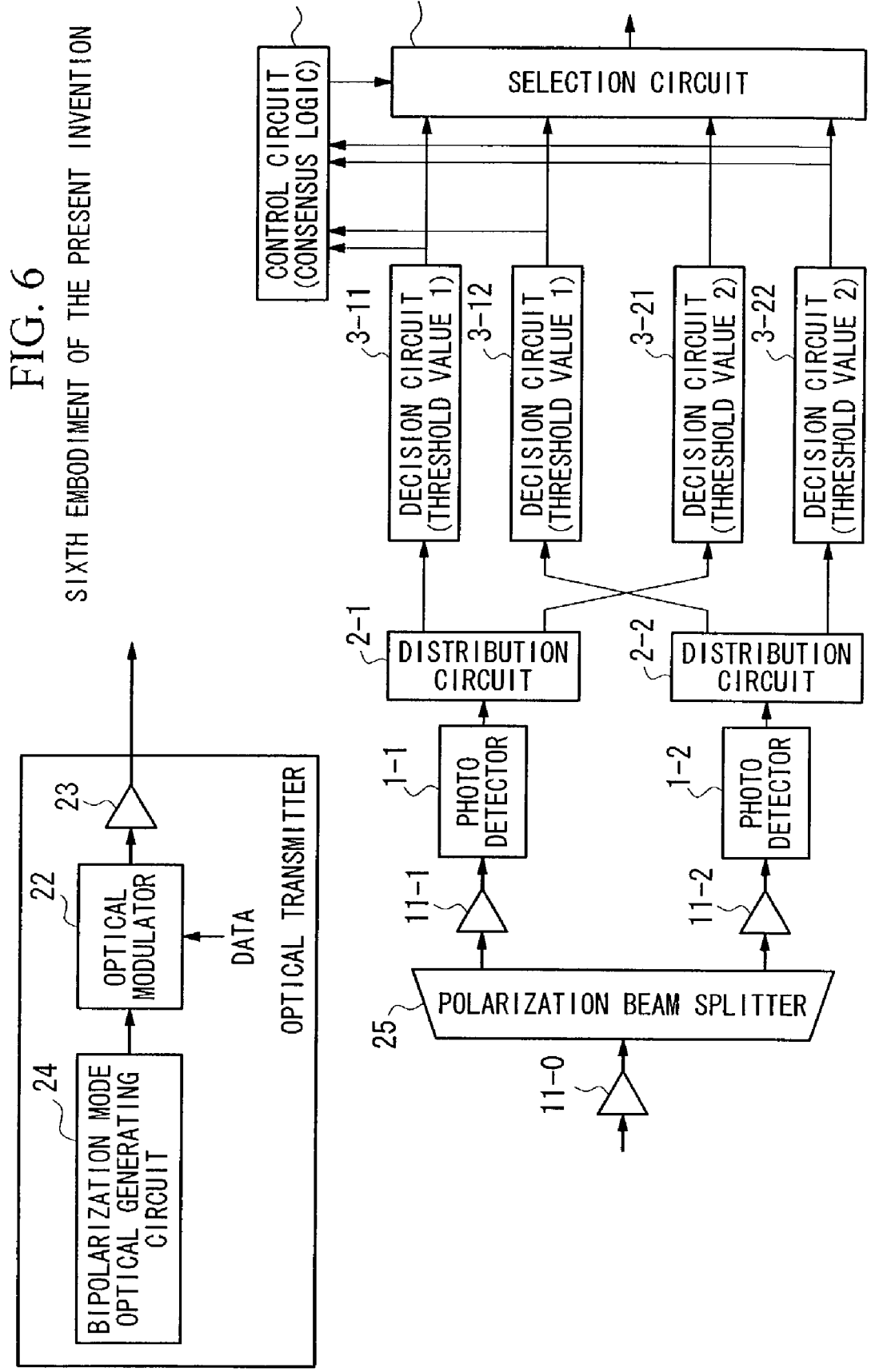
FIG. 6 shows the structure of a transmitter and receiver according to the sixth embodiment of the present invention.

FIG. 6 shows the sixth embodiment of the present invention. In the present embodiment a bipolarization mode optical generating circuit 24 is used instead of the two-mode optical pulse generating circuit 21 of the optical transmitter of the fourth embodiment, and a polarization beam splitter 25 is used instead of the optical filter 14 of the receiving apparatus.

The bipolarization mode optical generating circuit 24 generates optical pulses or continuous light in two polarization modes (this can be simply enabled by using conventional optical modulation with selecting output polarization state as 45 degrees with respect to optical fiber principal states of polarization). The polarization beam splitter 25 splits optical signals of two polarization modes into each polarization, and thereafter, in the same way as in the third embodiment, the optical signals are then converted into electrical signals by respective photo detectors 1-1 and 1-2. It should be noted that the optical noise from optical amplifiers is independent with respect to the polarization states. These electrical signals are then input into decision circuits 3-11 and 3-22 that correspond to each via distribution circuits 2-1 and 2-2, and a single decision result is selected by the same "consensus logic" as in the first embodiment.

Note that polarization mode dispersion (PMD), polarization dependent loss (PDL), and the like can be given as causes of waveform degradation that depend on polarization, however, in the structure of the present embodiment, it is possible to improve those reception characteristics that are affected by waveform degradation and the like that depend on polarization.

Seventh Embodiment

Figure 7:
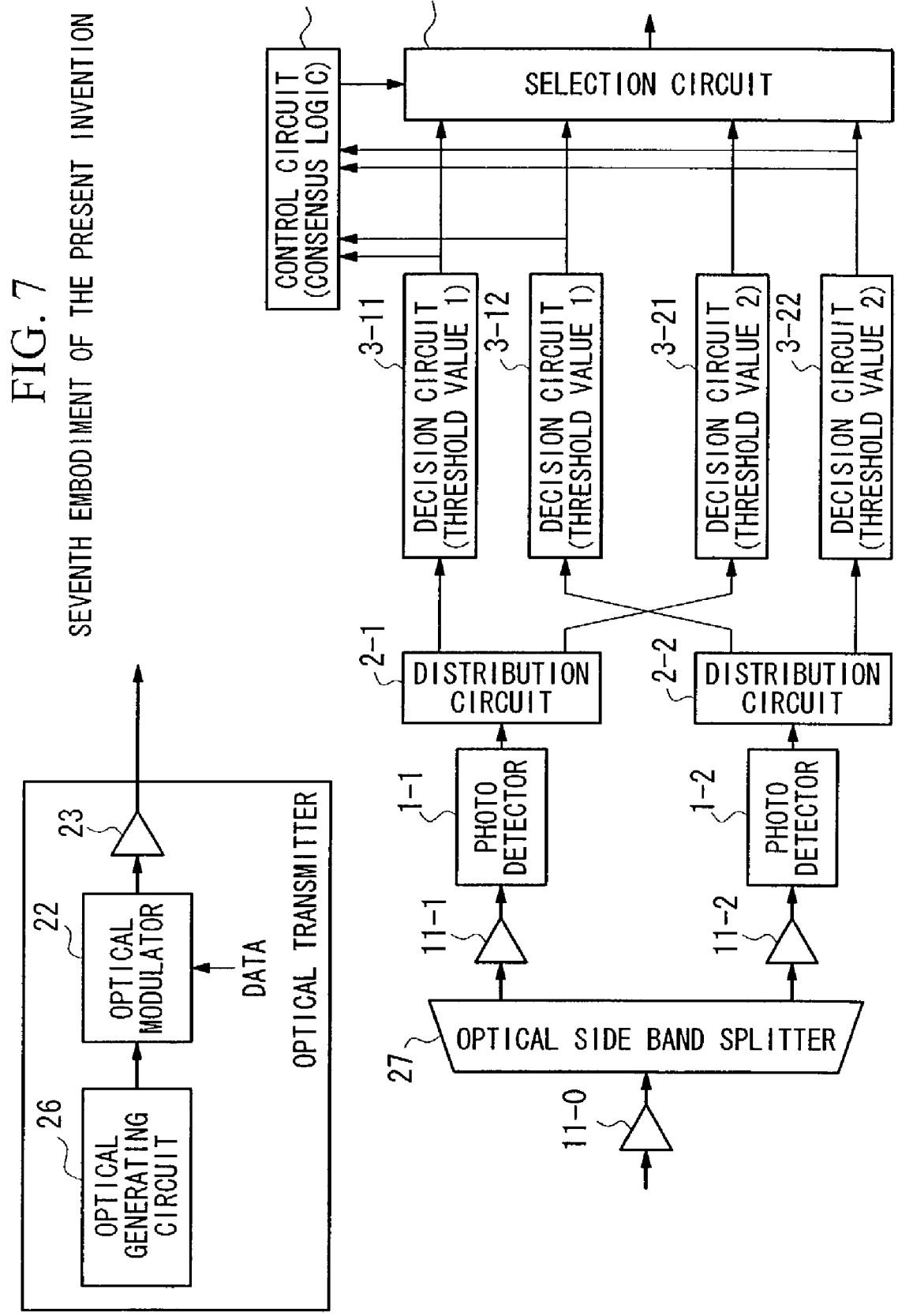
FIG. 7 shows the structure of a transmitter and receiver according to the seventh embodiment of the present invention.

FIG. 7 shows the seventh embodiment of the present invention. The feature of this embodiment is that a structure is employed in which the two optical frequencies or modes, such as in the fourth and fifth embodiments, are not used.

In FIG. 7, a transmitting apparatus modulates by data signals continuous light or optical pulses output from an optical generating circuit 26 using an optical modulator 22. This structure is the same as the structure of a normal NRZ or RZ transmitting apparatus, and, compared to the fourth embodiment or fifth embodiment, enables the frequency utilization efficiency to be increased.

The optical sideband splitter 27 of the receiving apparatus cuts out side band waves of a normal NRZ or RZ spectrum and splits them into two modes (so called Vestigial Side Band splitting). Thereafter, in the same way as in the third embodiment, these signals are converted into electrical signals respectively by photo detectors 1-1 and 1-2, and these electrical signals are then input into the decision circuits 3-11 to 3-22 that correspond to each via distribution circuits 2-1 and 2-2. Then, a single decision result is selected using the same "consensus logic" as in the first embodiment. For the photo detectors 1-1 and 1-2 a single side band receiver or a vestigial side band receiver can be used (document of reference: S. Bigo et al., Dig. OFC2001, PD25, 2001).

Eighth Embodiment

FIG. 8 shows the eighth embodiment of the present invention. Note that the structure of the transmitting apparatus side is the same as a conventional structure, and here an example of the structure of the receiving apparatus side is shown. Furthermore, a description is given of an example of a receiving apparatus in an optical transmission system, however, the present embodiment is not limited to this.

In FIG. 8, optical signals are amplified by an optical amplifier 11-0, and are then distributed to two series by an optical distribution circuit (optical coupler) 12. Each of the distributed optical signals is then amplified respectively by optical amplifiers 11-1 and 11-2, and is then converted into electrical signals by photo detectors 1-1 and 1-2. The respective electrical signals are then input into a decision circuit 3-12 and a decision circuit 3-11 having a threshold value H that is set higher than the standard threshold value. The decision result of each decision circuit is input into the control circuit 4, and one of these decision results (in this case the output from the decision circuit 3-11) is input into the selection circuit 5. In addition, a signal for logic 1 is input into the selection circuit 5 from a fixed voltage generator 15. The control circuit 4 controls the selection circuit 5 based on the decision result from each decision circuit, and selects and outputs the output of the fixed voltage generator 15 or the decision result from a single decision circuit.

For example, as is shown in FIG. 8, if a logic 0 reception signal is input into a decision circuit, because the threshold value of each decision circuit is set higher than the standard threshold value, even if a slight amount of noise is attached, there is a high probability that the two decision results will both be logic 0. At this time, the control circuit 4 controls the selection circuit 5 such that the decision result (logic 0) of the decision circuit 3-11 is selected (as shown by the circles in the drawing).

In contrast, if a logic 1 reception signal is input into a decision circuit, there is a high probability that, due to noise addition, either the two decision results will both be logic 1 or that one decision result will be logic 1. Accordingly, if at least decision result is logic 1, it is determined that the reception signals is a logic 1 signal and the output of the fixed voltage generator 15 (logic 1) is selected. As a result, it is possible to output a logic 1 signal with no noise component.

The above determination by the control circuit 4 can be realized using an OR circuit. Moreover, if both decision results are logic 1, in the same way as when they are both logic 0, it is possible to select the decision result of the decision circuit 3-11 (logic 1). In this case, the control circuit 4 may be realized by using an exclusive OR circuit. This also applies when the number of decision circuits is three or more. Furthermore, when the threshold values of the decision circuits 3-11 and 3-12 are set lower than the standard threshold value, the same effect can be achieved by inverting the above logic.

Furthermore, in the present embodiment, an example is described in which the fixed voltage generator 15 that outputs logic 1 is used, however, if a fixed voltage generator that outputs logic 0 is added and the two decision results are both logic 0, it is also possible to select the output of this fixed voltage generator (logic 0). As a result, it is possible to output a signal with no noise component for logic 0 as well. In this case, the control circuit determines whether the reception signal is logic 1 or logic 0 in accordance with whether at least one of the two decision results is logic 1 or whether both are logic 0. Based on this determination, the logic 1 or logic 0 signal is selected from the fixed voltage generator.

Ninth Embodiment

FIG. 9 shows the ninth embodiment of the present invention. Note that the structure of the transmitting apparatus side is the same as a conventional structure, and here an example of the structure of the receiving apparatus side is shown. Furthermore, a description is given of an example of a receiving apparatus in an optical transmission system, however, the present embodiment is not limited to this.

In FIG. 9, optical signals are amplified by an optical amplifier 11-0, and are then distributed to two series by an optical distribution circuit (optical coupler) 12. Each of the distributed optical signals is then amplified respectively by optical amplifiers 11-1 and 11-2, and is then converted into electrical signals by photo detectors 1-1 and 1-2. Electrical signals output from the photo detector 1-1 are then distributed again to two series by an distribution circuit 2-1 and are then input respectively into a decision circuit 3-11 having a threshold value H that is set higher than the standard threshold value and a decision circuit 3-12 having a threshold value L that is set lower than the standard threshold value. Electrical signals output from the photo detector 1-2 are input into a decision circuit 3-13 set to the standard threshold value M. The decision result of each decision circuit is input into the control circuit 4, and the outputs from the decision circuit 3-11 and the decision circuit 3-13 are input into the selection circuit 5. The control circuit 4 controls the selection circuit 5 based on the decision result from the decision circuits 3-11 and 3-12, and selects and outputs the decision result from a single decision circuit.

For example, as is shown in FIG. 9, if a reception signal for logic 0 is input into the decision circuit 3-11 having the threshold value H and the decision circuit 3-12 having the threshold value L, there is a high probability that, due to noise addition, the two decision results will both be logic 0, or that the decision result of the decision circuit 3-12 having the threshold value L will be logic 1. Accordingly, if both decision results are logic 0, the selection circuit 5 is controlled such that the decision result of the decision circuit 3-11 having the threshold value H (logic 0) is selected. If the decision result of the decision circuit 3-12 having the threshold value L is logic 1, the selection circuit 5 is controlled such that the determination is entrusted to the decision circuit 3-13 having the threshold value M, and this determination result is selected.

If, however, a reception signal for logic 1 is input into the decision circuit 3-11 having the threshold value H and the decision circuit 3-12 having the threshold value L, there is a high probability that, due to noise addition, the two decision results will both be logic 1, or that the decision result of the decision circuit 3-11 having the threshold value H will be logic 0. Accordingly, if both decision results are logic 1, the selection circuit 5 is controlled such that the decision result of the decision circuit 3-11 having the threshold value H (logic 1) is selected. If the decision result of the decision circuit 3-11 having the threshold value H is logic 0, the selection circuit 5 is controlled such that the determination is entrusted to the decision circuit 3-13 having the threshold value M, and this determination result is selected.

Note that the above determination by the control circuit 4 can be realized using an exclusive OR circuit.

Tenth Embodiment

FIG. 10 shows the tenth embodiment of the present invention. In the second and third embodiments, structures are employed in which received optical signals are distributed to a plurality of series, and decision determinations are made that include noise from optical amplifiers and photo detectors, however, in the present embodiment, a structure is employed in which signals that have been transmitted in parallel from the transmission side on a plurality of optical transmission paths are received. Namely, new diversity receiving apparatus selection logic is provided. It should be noted, however, that in the present invention, using bit unit consensus logic, the decision circuit having the optimum threshold value is selected and the decision result thereof employed.

In FIG. 10, optical signals received from a plurality of optical transmission paths are input into photo detectors 1-1 and 1-2 via the respective corresponding optical amplifier 11-1 or 11-2. The subsequent structure is the same as that employed in the second and third embodiments, however, because signals that have different delays from the different transmission paths are being decided, delay circuits 16-1 and 16-2 are provided in order to synchronize the signals.

In the present embodiment, the light from a plurality of optical transmission paths is each independent, and the present embodiment makes use of the fact that noise received from all of the optical repeaters on the optical transmission path becomes unrelated random noise between transmission paths. As a result, by deciding optical signals corresponding to the two optical transmission paths using decision circuits having different threshold values and selecting one using "consensus logic", it is even possible to correct bit errors caused by noise from optical repeaters.

Note also the structure described in the fifth and sixth embodiments may be employed for the structure of the decision circuits and the selection logic thereof.

The above is a detailed description of the present invention utilizing drawings, however, the specific structure of the present invention is not limited by the above embodiments and various designs and the like may also be considered insofar as they do not deviate from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A digital transmission system comprising:
    a transmitting apparatus that transmits digital data optical signals, and
    a receiving apparatus that receives the digital data optical signals transmitted over an optical transmission path, converts the digital data optical signals into electrical signals, compares the electrical signals with a predetermined threshold value, and performs decision reproduction,
    wherein the receiving apparatus comprises:
    k number of decision circuit sets each having a different threshold value, with one set comprising a plurality, n number, of decision circuits having the same threshold value, each of the plurality, n number, of decision units in each decision unit set being configured to receive a reception signal and make a decision, independently from other decision units, on the reception signal with reference to the same threshold value thereby outputting a decision result;

distribution circuits that distribute the electrical signals to the decision circuits;

a selection circuit that selects and outputs one decision result from the decision circuits; and a control circuit that controls the selection circuit such that the input of the decision results is received from each decision circuit, a set in which the decision result of n number of decision circuits are the same is selected from all sets, and the decision result of one decision circuit from that one set is selected.

2. A digital transmission system having a transmitting apparatus that transmits digital data optical signals and a receiving apparatus that receives the digital data optical signals transmitted over an optical transmission path, converts the digital data optical signals into electrical signals, compares the electrical signals with a predetermined threshold value, and performs decision reproduction, wherein the receiving apparatus comprises:

k number of decision circuit sets each having a different threshold value, with one set formed by n number of decision circuits having the same threshold value;

n number of pairs, each comprising a photo detector and a distribution circuit, each photo detector receiving one of the digital data optical signals, each photo detector converting the digital data optical signal into an electrical signal, each distribution circuit receiving the electrical signal from the paired photo detector, each distribution circuit distributing the electrical signal to the k number of decision circuit sets;

an optical distribution circuit that distributes the digital data optical signals to the n number of pairs;

optical amplifiers that amplify optical signals at least one of the optical distribution circuits and the photo detectors;

a selection circuit that selects and outputs one decision result from the decision circuits; and a control circuit that controls the selection circuit such that the input of the decision result is received from each decision circuit, a set in which the decision results of n number of decision circuits are the same is selected from all sets, and the decision result of one decision circuit from that one set is selected.

3. The digital transmission system according to claim 2, wherein the receiving apparatus is provided with an optical frequency conversion circuit that converts an optical frequency of the digital data optical signals and outputs optical signals of a plurality of optical frequencies, and the optical distribution circuit is provided with an optical filter that splits optical signals of a plurality of optical frequencies into each optical frequency and then provides each optical frequency signal to a respective photo detector.

4. The digital transmission system according to claim 2, wherein the transmitting apparatus has a structure that modulates optical pulses of a plurality of frequency modes using digital data signals and then transmits the resulting signals, and the optical distribution circuit in the receiving apparatus is provided with an optical filter that splits optical pulse signals of a plurality of frequency modes and then provides each optical frequency mode signal to a respective photo detector.

5. The digital transmission system according to claim 2, wherein the transmitting apparatus has a structure that modulates continuous light of a plurality of optical frequencies using digital data signals and then transmits the resulting signals, and the optical distribution circuit in the receiving apparatus is provided with an optical filter that splits optically modulated signals of a plurality of optical frequencies and then provides each optical frequency signal to a respective photo detector.

6. The digital transmission system according to claim 2, wherein the transmitting apparatus has a structure that modulates light having a plurality of polarization modes using digital data signals and then transmits the resulting signals, and the optical distribution circuit in the receiving apparatus is provided with a polarization beam splitter that splits optically modulated signals of a plurality of polarization modes and then provides each optical polarization mode signal to a respective photo detector.

7. The digital transmission system according to claim 2, wherein the transmitting apparatus has a structure that modulates continuous light or optical pulses using digital data signals and then transmits the resulting signals, and the optical distribution circuit in the receiving apparatus is provided with an optical side band splitter that splits into two an optical spectrum of received optically modulated signals and then provides each optical split signal to a respective photo detector.

8. The digital transmission system according to claim 1 or 2, wherein one set of n number of decision circuits that have the same threshold value and whose threshold value is set higher in a first case or lower in a second case than a standard threshold value is provided as a decision circuit, and there is further provided a fixed voltage generator that inputs logic 1 in the first case or logic 0 in the second case into the selection circuit, and, if logic 1 in the first case or logic 0 in the second case is included in the decision results of the n number of decision circuits, the control circuit controls the selection circuit such that an output signal of the fixed voltage generator is selected, while, if logic 1 in the first case or logic 0 in the second case is not included in the decision results of the n number of decision circuits, the control circuit controls the selection circuit such that a decision result of one of the decision circuits is selected.

9. The digital transmission system according to claim 1 or 2, wherein three decision circuits respectively having a standard threshold value, a threshold value set higher than the standard threshold value, and a threshold value set lower than the standard threshold value are provided, and an output from the decision circuit whose threshold value is set higher than the standard threshold value and an output from the decision circuit whose threshold value is set to the standard threshold value are connected to the selection circuit, and, if a decision result of either the decision circuit whose threshold value is set higher than the standard threshold value or the decision circuit whose threshold value is set lower than the standard threshold value but not both is logic 1, the control circuit controls the selection circuit such that a decision result of the decision circuit having the standard threshold value is selected, while, if both decision results from the decision circuits whose threshold values are set higher and lower than the standard threshold value are logic 1 or logic 0, the control circuit controls the selection circuit such that a decision result of the decision circuit whose threshold value is set higher than the standard threshold value is selected.

10. The digital transmission system according to claim 1 or 2, wherein the digital transmission system is structured such that digital data optical signals are transmitted from the transmitting apparatus to the receiving apparatus via a plurality of transmission paths, and the receiving apparatus is provided with delay circuits that equalize time differences between signals transmitted over the plurality of transmission paths.

11. A digital transmission system comprising:
a transmitting apparatus that transmits digital data signals; and
a receiving apparatus that receives the digital data signals transmitted over a transmission path, the receiving apparatus comparing the digital data signals with predetermined threshold values to perform decision reproduction,
wherein the receiving apparatus comprises:
a distribution unit configured to receive and distribute a reception signal;
decision unit sets that are each allocated with a different threshold value, each of the decision unit sets including a plurality of decision units that have the same threshold value, the decision units being configured to receive the reception signal from the distribution unit, each of the plurality of decision units in each decision unit set being configured to make a decision, independently from other decision units, on the reception signal with reference to the same threshold value thereby generating a decision result; and
a controller configured to receive the decision result from each of the decision units included in the decision unit sets, the controller being configured to select one of the decision results, and
wherein the transmission apparatus transmits digital data optical signals, the transmission path is an optical transmission path, and
the receiving apparatus receives the digital data optical signals transmitted over the optical transmission path, converts the digital data optical signals into electrical signals, and compares the electrical signals with the predetermined threshold values to perform decision reproductions.

12. The digital data signal receiving apparatus according to claim 11, wherein the reception signal comprises bits or codes, and the controller is configured to select one of the decision results for each bit or each code included in the reception signal.

13. The digital data signal receiving apparatus according to claim 11, wherein the controller is configured to select one of the decision results in accordance with a consensus logic.

14. A digital data signal receiving apparatus comprising:
decision unit sets that are each allocated with different threshold values, each of the decision unit sets including a plurality of decision units that have the same threshold value, the decision units being configured to receive a reception signal, each of the plurality of decision units in each decision unit set being configured to make a decision, independently from other decision units, on the reception signal with reference to the same threshold value thereby outputting a decision result; and
a selection circuit that selects a decision result from among the decision results output by the decision circuits,
wherein one set of n number of decision circuits that have the same threshold value and whose threshold value is set higher in a first case or lower in a second case than a standard threshold value is provided as a decision circuit, and there is further provided a fixed voltage generator that inputs logic 1 in the first case or logic 0 in the second case into the selection circuit, and, if logic 1 in the first case or logic 0 in the second case is included in the decision results of the n number of decision circuits, the selection circuit being controlled such that an output signal of the fixed voltage generator is selected, while, if logic 1 in the first case or logic 0 in the second case is not included in the decision results of the n number of decision circuits, the control circuit controls the selection circuit such that a decision result of one of the decision circuits is selected.

15. The digital signal receiving apparatus according to claim 14, wherein the reception signal contains bits or codes and, for each bit or each code contained in the reception signals, the selection circuit makes a new selection from the decision results.

16. A digital data signal receiving apparatus comprising:
decision unit sets that are each allocated with different threshold values, each of the decision unit sets including a plurality of decision units that have the same threshold value, the decision units being configured to receive a reception signal, each of the plurality of decision units in each decision unit set being configured to make a decision, independently from other decision units, on the reception signal with reference to the same threshold value thereby outputting a decision result; and
a selection circuit that selects a decision result from among the decision results output by the decision circuits,
wherein three decision circuits respectively having a standard threshold value, a threshold value set higher than the standard threshold value, and a threshold value set lower than the standard threshold value are provided, and an output from the decision circuit whose threshold value is set higher than the standard threshold value and an output from the decision circuit whose threshold value is set to the standard threshold value are connected to the selection circuit, and, if a decision result of either the decision circuit whose threshold value is set higher than the standard threshold value or the decision circuit whose threshold value is set lower than the standard threshold value but not both is logic 1, a control circuit controls the selection circuit such that a decision result of the decision circuit having the standard threshold value is selected, while, if both decision results from the decision circuits whose threshold values are set higher and lower than the standard threshold value are logic 1 or logic 0, the control circuit controls the selection circuit such that a decision result of the decision circuit whose threshold value is set higher than the standard threshold value is selected.

17. The digital data signal receiving apparatus according to claim 16, wherein the reception signal contains bits or codes and, for each bit or each code contained in the reception signal, the selection circuit makes a new selection from the decision results.

18. A digital data signal receiving apparatus comprising:
decision unit sets that are each allocated with different threshold values, each of the decision unit sets including a plurality of decision units that have the same threshold value, the decision units being configured to receive a reception signal, each of the plurality of decision units in each decision unit set being configured to make a decision, independently from other decision units, on the reception signal with reference to the same threshold value thereby outputting a decision result; and
a selection circuit that selects a decision result from among the decision results output by the decision circuits,
wherein the digital signal receiving apparatus is structured such that digital data signals or digital data optical signals are transmitted from a transmitting apparatus to the receiving apparatus via a plurality of transmission paths, and the receiving apparatus is provided with delay circuits preceded by optical to electrical converters that equalize time differences between signals transmitted over the plurality of transmission paths, and distribute signals from the transmission paths to the plurality of decision circuits.

19. The digital data signal receiving apparatus according to claim 18, wherein the reception signal contains bits or codes and, for each bit or each code contained in the reception signal, the selection circuit makes a new selection from the decision results.

20. A digital transmission system comprising:
a transmitting apparatus that transmits digital data signals; and
a receiving apparatus that receives the digital data signals transmitted over a transmission path, compares them with a predetermined threshold value, and performs decision reproduction,
wherein the receiving apparatus comprises:
k number of decision circuit sets each having a different threshold value, with one set comprising a plurality, n number, of decision circuits having the same threshold value, each of the plurality, n number, of decision units in each decision unit set being configured to receive a reception signal and make a decision, independently from other decision units, on the reception signal with reference to the same threshold value thereby outputting a decision result;
distribution circuits that distribute the reception signals to the decision circuits;
a selection circuit that selects and outputs one decision result from the decision circuits; and
a control circuit that controls the selection circuit such that the input of the decision result is received from each decision circuit, a set in which the decision results of n number of decision circuits are the same is selected from all sets, and the decision result of one decision circuit from that one set is selected,
wherein one set of n number of decision circuits that have the same threshold value and whose threshold value is set higher in a first case or lower in a second case than a standard threshold value is provided as a decision circuit, and there is further provided a fixed voltage generator that inputs logic 1 in the first case or logic 0 in the second case into the selection circuit, and, if logic 1 in the first case or logic 0 in the second case is included in the decision results of the n number of decision circuits, the control circuit controls the selection circuit such that an output signal of the fixed voltage generator is selected, while, if logic 1 in the first case or logic 0 in the second case is not included in the decision results of the n number of decision circuits, the control circuit controls the selection circuit such that a decision result of one of the decision circuits is selected.

21. A digital transmission system comprising:
a transmitting apparatus that transmits digital data signals; and
a receiving apparatus that receives the digital data signals transmitted over a transmission path, compares them with a predetermined threshold value, and performs decision reproduction,
wherein the receiving apparatus comprises:
k number of decision circuit sets each having a different threshold value, with one set comprising a plurality, n number, of decision circuits having the same threshold value, each of the plurality, n number, of decision units in each decision unit set being configured to receive a reception signal and make a decision, independently from other decision units, on the reception signal with reference to the same threshold value thereby outputting a decision result;
distribution circuits that distribute the reception signals to the decision circuits:
a selection circuit that selects and outputs one decision result from the decision circuits; and
a control circuit that controls the selection circuit such that the input of the decision result is received from each decision circuit, a set in which the decision results of n number of decision circuits are the same is selected from all sets, and the decision result of one decision circuit from that one set is selected,
wherein three decision circuits respectively having a standard threshold value, a threshold value set higher than the standard threshold value, and a threshold value set lower than the standard threshold value are provided, and an output from the decision circuit whose threshold value is set higher than the standard threshold value and an output from the decision circuit whose threshold value is set to the standard threshold value are connected to the selection circuit, and, if a decision result of either the decision circuit whose threshold value is set higher than the standard threshold value or the decision circuit whose threshold value is set lower than the standard threshold value but not both is logic 1, the control circuit controls the selection circuit such that a decision result of the decision circuit having the standard threshold value is selected, while, if both decision results from the decision circuits whose threshold values are set higher and lower than the standard threshold value are logic 1 or logic 0, the control circuit controls the selection circuit such that a decision result of the decision circuit whose threshold value is set higher than the standard threshold value is selected.

22. A digital transmission system comprising:
a transmitting apparatus that transmits digital data signals; and
a receiving apparatus that receives the digital data signals transmitted over a transmission path, compares them with a predetermined threshold value, and performs decision reproduction,
wherein the receiving apparatus comprises:
k number of decision circuit sets each having a different threshold value, with one set comprising a plurality, n number, of decision circuits having the same threshold value, each of the plurality, n number, of decision units in each decision unit set being configured to receive a reception signal and make a decision, independently from other decision units, on the reception signal with reference to the same threshold value thereby outputting a decision result;
distribution circuits that distribute the reception signals to the decision circuits;
a selection circuit that selects and outputs one decision result from the decision circuits; and
a control circuit that controls the selection circuit such that the input of the decision result is received from each decision circuit, a set in which the decision results of n number of decision circuits are the same is selected from all sets, and the decision result of one decision circuit from that one set is selected,
wherein the digital transmission system is structured such that digital data signals or digital data optical signals are transmitted from the transmitting apparatus to the receiving apparatus via a plurality of transmission paths, and the receiving apparatus is provided with delay circuits preceded by optical to electrical converters that equalize time differences between signals transmitted over the plurality of transmission paths, and distribute signals from the transmission paths to the plurality of decision circuits.

23. A digital data signal receiving apparatus comprising:
decision unit sets that are each allocated with different threshold values, each of the decision unit sets including a plurality of decision units that have the same threshold value, the decision units being configured to receive a reception signal, each of the plurality of decision units in each decision unit set being configured to make a decision, independently from other decision units, on the reception signal with reference to the same threshold value thereby generating a decision result; and
a controller configured to receive the decision result from each of the decision units included in the decision unit sets, the controller having a selection circuit and being configured to select one of the decision results,
wherein one set of n number of decision circuits that have the same threshold value and whose threshold value is set higher in a first case or lower in a second case than a standard threshold value is provided as a decision circuit, and there is further provided a fixed voltage generator that inputs logic 1 in the first case or logic 0 in the second case into the selection circuit, and, if logic 1 in the first case or logic 0 in the second case is included in the decision results of the n number of decision circuits, the control circuit controls the selection circuit such that an output signal of the fixed voltage generator is selected, while, if logic 1 in the first case or logic 0 in the second case is not included in the decision results of the n number of decision circuits, the control circuit controls the selection circuit such that a decision result of one of the decision circuits is selected.

24. The digital data signal receiving apparatus according to claim 23, wherein the reception signal comprises bits or codes, and the controller is configured to select one of the decision results for each bit or each code included in the reception signal.

25. The digital data signal receiving apparatus according to claim 23, wherein the controller is configured to select one of the decision results in accordance with a consensus logic.

26. A digital signal receiving apparatus comprising:
decision unit sets that are each allocated with different threshold values, each of the decision unit sets including a plurality of decision units that have the same threshold value, the decision units being configured to receive a reception signal, each of the plurality of decision units in each decision unit set being configured to make a decision, independently from other decision units, on the reception signal with reference to the same threshold value thereby generating a decision result; and
a controller configured to receive the decision result from each of the decision units included in the decision unit sets, the controller having a selection circuit and being configured to select one of the decision results,
wherein three decision circuits respectively having a standard threshold value, a threshold value set higher than the standard threshold value, and a threshold value set lower than the standard threshold value are provided, and an output from the decision circuit whose threshold value is set higher than the standard threshold value and an output from the decision circuit whose threshold value is set to the standard threshold value are connected to the selection circuit, and, if a decision result of either the decision circuit whose threshold value is set higher than the standard threshold value or the decision circuit whose threshold value is set lower than the standard threshold value but not both is logic 1, the control circuit controls the selection circuit such that a decision result of the decision circuit having the standard threshold value is selected, while, if both decision results from the decision circuits whose threshold values are set higher and lower than the standard threshold value are logic 1 or logic 0, the control circuit controls the selection circuit such that a decision result of the decision circuit whose threshold value is set higher than the standard threshold value is selected.

27. The digital data signal receiving apparatus according to claim 26, wherein the reception signal comprises bits or codes, and the controller is configured to select one of the decision results for each bit or each code included in the reception signal.

28. The digital data signal receiving apparatus according to claim 26, wherein the controller is configured to select one of the decision results in accordance with a consensus logic.

29. A digital data signal receiving apparatus comprising:
decision unit sets that are each allocated with different threshold values, each of the decision unit sets including a plurality of decision units that have the same threshold value, the decision units being configured to receive a reception signal, each of the plurality of decision units in each decision unit set being configured to make a decision, independently from other decision units, on the reception signal with reference to the same threshold value thereby generating a decision result; and
a controller configured to receive the decision result from each of the decision units included in the decision unit sets, the controller having a selection circuit and being configured to select one of the decision results,
wherein the digital transmission system is structured such that digital data signals or digital data optical signals are transmitted from a transmitting apparatus to the receiving apparatus via a plurality of transmission paths, and the receiving apparatus is provided with delay circuits that equalize time differences between signals transmitted over the plurality of transmission paths, and distribute signals from the transmission paths to the plurality of decision circuits.

30. The digital data signal receiving apparatus according to claim 29, wherein the reception signal comprises bits or codes, and the controller is configured to select one of the decision results for each bit or each code included in the reception signal.

31. The digital data signal receiving apparatus according to claim 29, wherein the controller is configured to select one of the decision results in accordance with a consensus logic.

* * * * *